United States Patent [19]

Vlahos

[11] 4,044,207
[45] Aug. 23, 1977

[54] APPARATUS FOR REPRODUCING A MULTIPLE TRACK PHOTOGRAPHIC SOUND RECORD

[75] Inventor: Petro Vlahos, Tarzana, Calif.

[73] Assignee: The Association of Motion Picture and Television Producers, Inc., Hollywood, Calif.

[21] Appl. No.: 630,966

[22] Filed: Nov. 12, 1975

[51] Int. Cl.² .............................................. G11B 7/20
[52] U.S. Cl. ...................... 179/100.3 B; 179/100.3 R; 179/100.3 E; 179/100.1 TD; 250/578
[58] Field of Search .................. 179/100.3 B, 100.3 T, 179/100.3 R, 100.3 L, 100.3 E, 100.3 GN, 100.1 TD; 250/578, 208

[56] References Cited

U.S. PATENT DOCUMENTS

| 2,101,121 | 12/1937 | Wixon | 179/100.3 R |
| 2,972,022 | 2/1961 | Byrd | 179/100.1 TD |
| 3,474,194 | 10/1969 | Lees | 179/100.1 TD |

Primary Examiner—Bernard Konick
Assistant Examiner—Alan Faber

[57] ABSTRACT

A multiple channel motion picture sound record is reproduced with selective control of the cross-talk between channels due to film weave. Such control is effected by lateral offset of the respective sound sensors, and conserves limited available width of the sound record. Also, tracks at both edges of a multi-track record are modulated in like phase by a common sound channel to minimize certain effects of film weave.

5 Claims, 3 Drawing Figures

APPARATUS FOR REPRODUCING A MULTIPLE TRACK PHOTOGRAPHIC SOUND RECORD

This invention has to do with sound recording on motion picture film, and is concerned more particularly with minimizing harmful effects of film weave, especially when several sound tracks are contained within the same physical boundaries that were formerly occupied by a single sound track.

The term "film weave" in the present specification and claims refers to any variation from normal that may occur in the lateral position of the sound track area as the film passes through a motion picture sound reproducing apparatus. Such variation may originate during recording or printing, but is ordinarily caused by imperfect edge guiding of the film in the sound reproducer. Under normal commercial practice with 35mm film the maximum film weave is ordinarily about ± 0.004 inch, or a total range of movement of 8 mils. That value will be used for illustration in the present description.

The present ANSI standards for 35mm film, which were established many years ago, provide a film track area approximately 100 mils wide, or more than 10 times the normal total film weave. Under that condition the weave can be fully accommodated without significant loss of signal amplitude by optically scanning the track with a slit that is either 8 mils longer than the track width, or, in the case of variable density tracks, 8 mils shorter than the track width.

However, the recent trend toward stereophonic sound has stimulated efforts to record several sound tracks within the regular sound track area. Although two channels suffice for simple stereophonic sound, improved quality is obtained with three channels, typically representing sound components at center, right and left of the stage; and one or two further sound channels are often highly desirable for special effects of well known type. Any such increase in the number of sound channels brings the width of each sound track into the range of only 2 to 5 times the total film weave of 8 mils. The problem of accommodating weave under that condition becomes critical.

The practical feasibility of such multiple track sound records has been enhanced by the recent discovery of variable hue sound recording on color film, which is more fully described and is claimed in the copending patent application filed by the present applicant on Nov. 8, 1974, Ser. No. 522,233, U.S. Pat. No. 3,969,593 under the title Sound Recording on Color Film by Hue Modulation. In hue modulated sound records each channel is typically recorded as two mutually superposed variable density sound records of distinctively different colors modulated in mutually opposite phase. The sound amplitude variations are then represented by variations of the ratio of those two colors in the light transmitted by a scanning slit. During reproduction, the two color components are separately sensed, and the resulting electrical push-pull signals are subtracted to produce the sound signal. Since the variable density records in the two colors are directly superposed on the film, imperfections due to such causes as dust and scratches tend to affect both color components equally. Hence such imperfections are cancelled out in the push-pull output circuitry of the sound reproducer. Largely because of that inherent noise compensation, it is practicable to make variable hue sound tracks much narrower than conventional variable density tracks. Hence three, or even five, distinct sound tracks can be recorded in the space previously occupied by a single sound track.

Accordingly, the present invention is especially useful in connection with sound tracks of variable hue type. However, the invention applies also to conventional variable density sound records. The term "variable density," when not otherwise qualified, is intended to embrace both conventional variable density and variable hue sound records.

Variable density sound recording has the important practical advantage that the audio information, in any given track, extends all the way across the track. The specific density at any lineal point along the track is of a single value across the track. Any small segment of the track is identical to any other segment of the track and each segment contains the full audio information. Accordingly, if the weave is such that some portion of the track is not scanned, the result is only a reduction of signal level. Such loss of level is proportional at all levels, and hence occurs without clipping signal peaks and without inducing distortion such as would occur on a variable area track, where signal peaks are more affected than other portions.

The present invention approaches the problem of film weave in variable density multi-track sound records by selecting those effects of film weave that are potentially most damaging, and concentrating attention upon the reduction or elimination of those effects.

One aspect of the invention reduces the harmful effects of film weave upon the two tracks at the opposite edges of a multi-track area. That is accomplished by modulating those two outer tracks in like phase to represent a common sound channel and electrically summing their output signals. With suitable arrangement of the optical reproducing apparatus, the effect of film weave at one edge of the track area can then be compensated by its effect at the other edge.

A further aspect of the invention distinguishes between situations in which cross-talk between adjacent sound tracks can be accepted without significantly lowering the effective sound quality, and situations in which such cross-talk needs to be severely limited. The invention further provides means for reducing cross-talk selectively, controlling signal leakage between two tracks in the most harmful direction while permitting moderate leakage in the opposite direction. By taking advantage of such selectivity, only a minimum portion of the total track area must be devoted to cross-talk control.

The invention further provides a sound track configuration with five distinct sound tracks each of which can represent a distinct sound channel. Moreover, coordinated reproducing equipment is described by which such a sound record can be reproduced either in the full five-channel mode, as in theaters having suitable loudspeakers for that purpose, or in a modified four-channel mode, as in theaters having less elaborate equipment. In both cases the arrangement is such that the two outer sound tracks are completely immune to film weave of normal magnitude. That immunity applies both to variations of sound amplitude and to intrusion of sound from an adjacent channel. The described arrangement is particularly suitable for recording three channels of stereophonic sound in the three inner tracks for reproduction through stage speakers, with two channels of auxiliary sound in the two outer tracks for reproduction through speakers at the rear or sides of the auditorium.

A full understanding of the invention, and of its further objects and advantages, will be had from the following description of certain illustrative manners of carrying it out. The particulars of that description, and of the accompanying drawings which form a part of it, are intended only as illustration and not as a limitation upon the scope of the invention.

Figure 1:
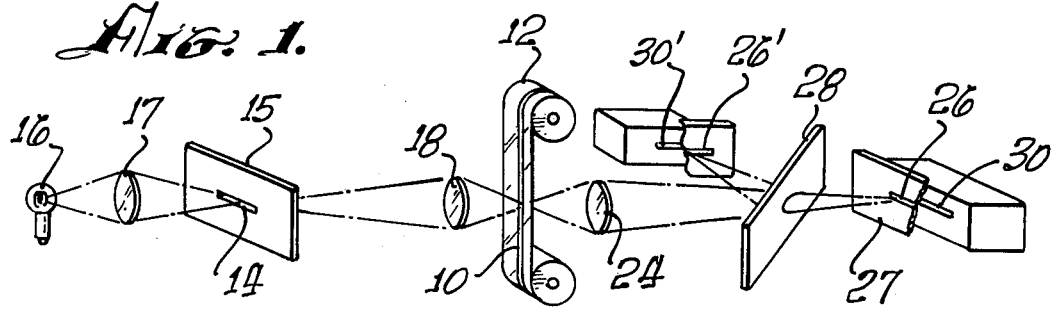
FIG. 1 is a schematic perspective representing illustrative apparatus for optically scanning a sound track.

FIG. 1 represents in schematic perspective illustrative apparatus for optically scanning the multiple track variable density sound record 10 carried by the moving film 12. The slit aperture 14 in the diaphragm 15 is uniformly illuminated by the light source 16 and lens 17, and is imaged by the lens 18 on the sound record. The lens 24 then forms an enlarged image of the illuminated record area at the narrow slit 26 in the diaphragm 27. An array of light sensors 30 is positioned immediately behind slit 26, and typically comprises an individual sensor dimensioned and positioned to receive light from each of the sound tracks of record 10.

The effective slit width by which the record is scanned is preferably set by the vertical dimension of slit 27, typically corresponding to about 0.001 inch at the sound record. In some systems that dimension may be set by the slit 14, or by a physical slit immediately adjacent the film. Lens 24 and diaphragm 27 can then be omitted and sensors 30 placed directly behind the film. However, when the slit and the individual sensors are located at an enlarged image of the film, as indicated in FIG. 1, the accuracy with which they must be dimensioned and adjusted is correspondingly reduced. For clarity in describing the dimensions of sensors 30 and slit 26 those parts will be considered to be imaged at reduced scale at the film, and the discussion can then be limited to the dimensional relationships of that image to the sound track.

When a hue modulated sound track is to be reproduced, a dichroic mirror is typically introduced at 28, which transmits one color component of the light beam to slit 26 and sensors 30 as already described, and reflects the other color component to the similar slit 26' and sensors 30'. The electrical signals from the pair of corresponding sensors for each track are then subtracted to derive the sound signal for that track. If the hue modulation employs more than two color components a corresponding number of sensor arrays are provided, with suitable optical means for delivering the proper spectral components to each array, and with suitable circuit means for processing the resulting electrical signals. Since the present invention concerns dimensional relationships which apply equally to each color component, the following description will be confined for the sake of clarity to a single component, which may be derived from a conventional variable density track, or may comprise a typical color component from a hue modulated track.

Figure 2:
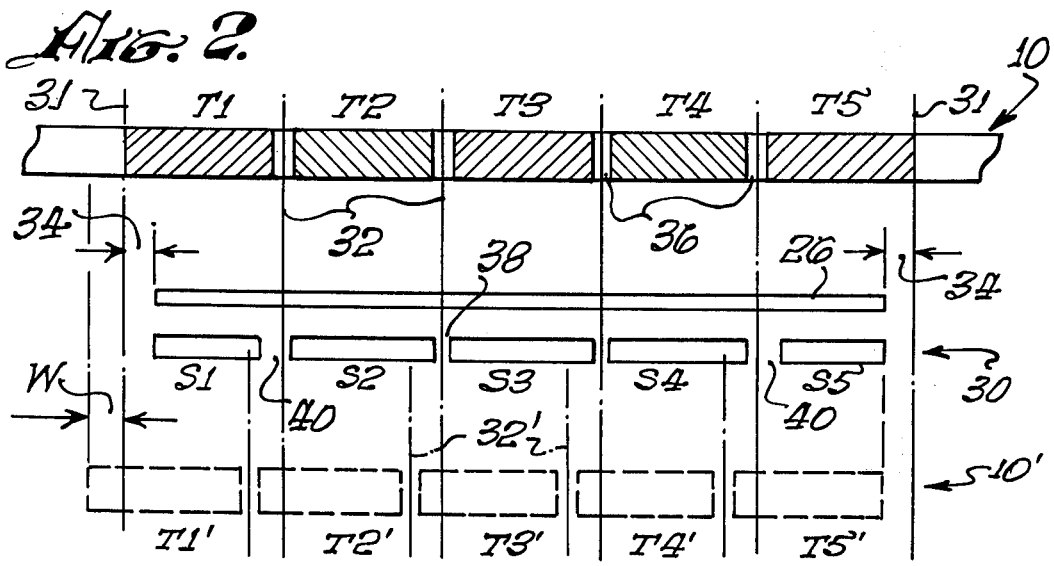
FIG. 2 is a schematic diagram illustrating the invention.

FIG. 2 represents illustrative dimensional relationships between a multi-track sound record and optical reproducing apparatus for effectively accommodating normal film weave while substantially conforming to present standards of the industry. The scanning light beam is assumed to be directed vertically downward onto the sound track area 10, which is represented in schematic cross section. Boundaries between the five closely adjacent variable density tracks T1 to T5 are indicated for clarity by the lines 32. Slit 26 and sensors 30 with individual effective areas indicated at S1 to S5 are indicated schematically at arbitrary distances below the sound record, but with horizontal dimensions representing a preferred normal relationship to the sound tracks. At zero film weave sound track area 10 typically extends beyond the slit and sensors at both ends by the 4 mil interval 34. At the bottom of the diagram the sound track area 10' and sound tracks T1' to T5' are represented in dashed lines, shifted bodily to the left relative to the stationary slit 26 and sensors 30 by the normal maximum film weave W, taken for illustration as 0.004 inch. The effect of that shift on the dimensional relationships, and hence on the sound reproduction, may be seen by comparing the vertical dashed boundary lines 32' between shifted sound tracks with the corresponding boundary lines 32 for the normal film position. A similar film shift in the other direction produces symmetrical effects, and does not require detailed discussion.

Taking the total width of sound track area 10 as 0.100 inch, which is the maximum space normally available on 35mm film, each of the equal tracks T1 to T5 has a nominal width of 20 mils. Although no intentional septum is employed between adjacent tracks, the recording process typically results in a crossover or transition zone about 2 mils wide, indicated at 36, which can be considered to be opaque. The actual channel width is then 18 mils for inner channels T2, T3 and T4 and 19 mils for outer channels T1 and T5. The sensors S2, S3 and S4 for the three inner tracks are similarly separated by neutral intervals 38 of the same 2 mil width.

On the other hand, outer sensors S1 and S5 are separated from their respective neighbors S2 and S4 by larger intervals 40, of the order of the normal maximum film weave and shown typically as 4 mils. Moreover, those intervals are offset outward from the nominal track boundaries 32. That offset, shown typically as 1 mil, causes sensor intervals 40 to be placed unsymmetrically with respect to track intervals 36. As a result, under conditions of zero film weave, the outer edges of S2 and S4 are aligned with their corresponding track edges, but the adjacent edges of S1 and S5 are outwardly offset from their corresponding track edges by the illustrative distance of 2 mils.

As can be seen by inspection of FIG. 2, the described intervals 36, 38 and 40 permit a film weave of ± 2 mils to occur without producing any cross-talk, and also without altering the signal amplitude for any of the 5 tracks. For film weave between 2 and 4 mils, there is some cross-talk between channels T2 and T3 and between channels T3 and T4. Also, sensors S2 and S4 may each receive a small amount of audio from their respective neighboring tracks T1 and T5.

Such cross-talk is of little concern when the five sound tracks are employed in the particular manner already referred to, namely, that the three inner tracks supply respective stereophonic components to three primary loudspeakers arranged on the stage behind the motion picture screen, and the two outer tracks supply auxiliary sound to speakers located elsewhere in the auditorium. In the case of the three stage speakers, program material is usually recorded with deliberate cross-talk. The apparent source of sound, typically at a particular speaker, is maintained as long as its level is 3 to 6 db louder than the adjacent speakers. With the arrangement shown in FIG. 2, even if the film weave is as much as 4 mils, the maximum sound leakage between the three inner channels occupies only 2 mils of the 18 mil sensor. Hence the channel separation remains at about 17 db, which is more than adequate to maintain a positional reference at the screen.

The relationship between the stage speakers and the auxiliary speakers at the side or rear of the auditorium is more critical. Since most members of the audience are closer to the rear speakers than to the stage speakers, sound that emanates from both sources will be heard first from the rear speakers. Such sound will be identified as originating at the rear speakers, since the ear determines its sense of direction on the basis of the sounds of first arrival. Therefore sound intended for the stage speakers must not also occur in the rear speakers.

On the other hand, sounds intended for the rear speakers can leak to the stage speakers with no harmful effect provided the rear speaker level remains 3 to 6 db louder than the sound leaked to the stage speakers. Thus appreciable leakage from rear to front is acceptable, but leakage from stage to rear cannot be tolerated.

The above described unsymmetrical offset of intervals 40 of the sensor array with respect to the corresponding intervals 36 of the sound tracks results in a non-symmetrical cross-talk. The maximum normal film weave of 4 mils permits inner sensors S2 and S4 to receive some sound from the neighboring outer tracks T1 and T5, but outer sensors S1 and S5 remain fully isolated from inner tracks T2 and T4.

Thus, the present invention insures that sound intended for the primary source at the stage speakers will not be projected also from the auxiliary speakers at the rear. On the other hand, sounds intended for the rear speakers are permitted to leak to the stage speakers to a moderate extent. That slight compromise in the complete elimination of cross-talk permits improved efficiency in utilizing the limited track area available on the film. In particular, the normal minimum interval between tracks T1 and T2 and between T4 and T5 does not need to be increased; and no reduction is required in the lengths of inner sensors S2 and S4 relative to their respective tracks T2 and T4, or relative to central sensor S3. Thus the provision of unilateral isolation in the direction in which isolation is required permits optimum utilization of the limited sound track area.

The track configuration and the sound reproducing arrangement of FIG. 2 can be used virtually without change in theaters having facilities for reproducing only one channel of auxiliary sound. It is then only necessary to connect the two outer sensors S1 and S5 in any conventional circuit for summing their outputs, and to supply the resulting signal to the auxiliary speakers with suitable adjustment of volume. The selective control of cross-talk described above then continues to apply. When the sound record is intended for playing in theaters with only one channel of auxiliary speakers, the two edge tracks of FIG. 2 can usefully be modulated in like phase by a single channel of sound, which is then reproduced by summing the outputs from sensors S1 and S5, as just described.

In some theaters the scanning slit is only 0.084 inch long and cannot readily be adjusted to the 0.092 inch length represented in FIG. 2. The illustrated sound record can still be played in such theaters to good advantage. The above described relations continue to apply with respect to accommodation of film weave. Although the shorter slit reduces the effective length of sensors S1 and S5, the signal amplitude is still adequate for most types of auxiliary sound, especially if tracks T1 and T5 are summed.

In accordance with a further aspect of the invention, under certain conditions film weave can be accommodated most effectively by employing both outer tracks of a multitrack sound record for representing a single sound channel. That is true, in particular, when it is practicable to make both the slit length and the sensor array in the reproducer longer than the total width of the track area. For example, as illustrated schematically in FIG. 3, it may be desired to record two channels of stereophonic sound in the track area 40 which is limited to the usual variable density track width of 0.092 inch. The slit 42 and sensor array 44 can typically be made long enough to project beyond both edges of that sound record by the intervals 43, which equal the normal maximum film weave of 4 mils.

Under such conditions, the available sound track area is preferably divided into the three sound tracks T6, T7 and T8, with each of the two outer tracks T6 and T8 substantially half as wide as inner track T7. One sound channel is recorded in the usual manner in inner track T7. Both outer tracks are modulated in like phase by the other sound channel. The intervals 47 between adjacent tracks typically have the minimum practicable width, which will be considered negligible compared to the effective track width of 46 mils. The three corresponding sensors S6, S7 and S8 are separated by similar minimum intervals 48. With electrical summation of the output signals from sensors S6 and S8, the total signal for the outer tracks then equals the single signal from S7 under conditions of zero film weave.

Figure 3:
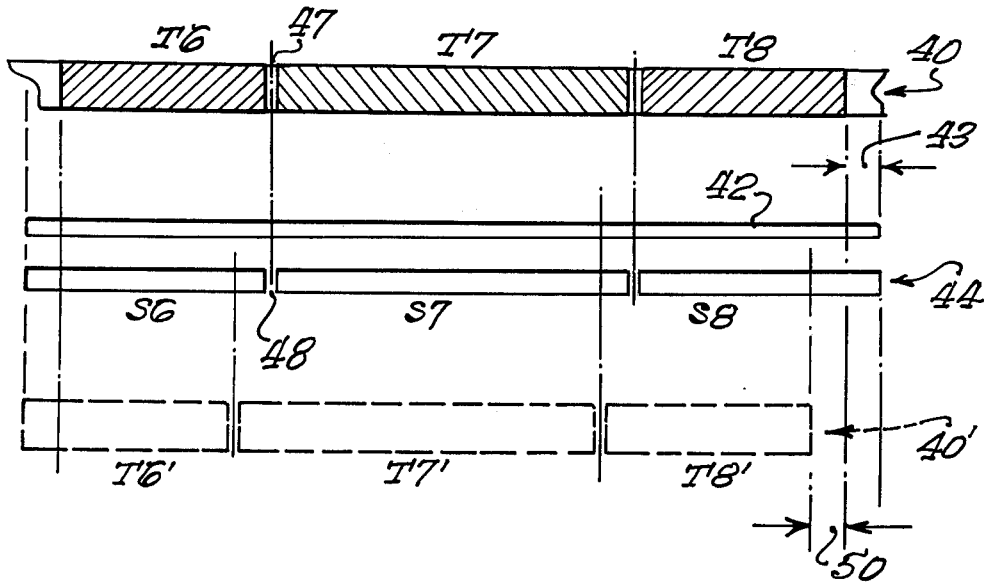
FIG. 3 is a schematic diagram illustrating further aspects of the invention.

To clarify the effect of film weave, FIG. 3 shows in dashed lines the sound track area 40' shifted to the left from its normal position by the normal maximum weave of 4 mils, indicated at 50. Comparing the lateral position of shifted track T8'' with fixed sensor S8, it is clear that 4 mils of the track at its left edge is not sensed by S8, reducing the signal from that sensor. However, sensor S6 continues to receive light from the entire width of shifted track T6', and also receives a contribution from the left edge of inner track T7'. Hence the sum signal from T6' and T8' remains substantially constant in amplitude. The signal from inner sensor S7 similarly remains substantially constant, since its loss of light from the left edge of shifted track T7' is approximately balanced by light received from the left edge of shifted track T8'.

It will be evident that the described approximate uniformity of signal amplitude involves cross-talk between the sterophonic channels. However, as already pointed out, such cross-talk is usually injected intentionally during recording, and the additional effects are scarcely detectable. Moreover, the fact that equal amounts of sound are typically leaked in each direction between the two channels tends further to conceal the effect.

On the other hand, if a similar sound track area is divided into two equal tracks modulated by respective stereophonic channels in conventional manner, film weave increases the sound amplitude of one channel at the expense of the other, injecting cross-talk first into one channel and then into the other with alternations in the direction of film weave. The arrangement of FIG. 3 substantially accommodates film weave under the described conditions, while permitting full utilization of the available sound track area.

I claim:

1. Apparatus for reproducing sound recorded on a film subject to film weave having a normal maximum value, said sound comprising a channel of primary sound and a channel of auxiliary sound recorded in respective adjacent variable density optical sound tracks which are laterally spaced by less than said normal maximum film weave; said apparatus comprising means for optically scanning the sound tracks with respective sensors responsive to film areas which correspond generally to the respective sound tracks and which are laterally separated from each other by an interval larger than said track spacing and of the order of the normal maximum film weave, said interval between areas being offset in the direction toward the track representing the auxiliary sound, whereby in the reproduced sound any cross-talk between channels due to film weave of said normal maximum value is substantially free of sound leakage from the primary sound channel to the auxiliary sound channel.

2. Apparatus according to claim 1 wherein said sound tracks are spaced from each other by not more than about 2 mils, and said space between the sensors is effectively about 4 mils.

3. Apparatus according to claim 1, including loudspeaker means at the stage area of an auditorium responsive to said channel of primary sound, and loudspeaker means at the back of the auditorium responsive to said channel of auxiliary sound.

4. Apparatus for reproducing sound recorded on a film subject to film weave having a normal maximum value, said sound comprising primary sound recorded in at least one inner sound track and auxiliary sound recorded in two outer sound tracks, the auxiliary sound tracks being spaced oppositely outward of the at least one primary sound track by less than said normal maximum film weave; said apparatus comprising means for optically scanning the sound tracks with respective sensors responsive to film area which correspond generally to the respective sound tracks, the sensor area for each auxiliary sound track being laterally separated from the adjacent sensor area for primary sound by an interval larger than said track spacing and of the order of the normal maximum film weave, said intervals between areas being offset in the respective directions toward the tracks representing auxiliary sound, whereby in the reproduced sound any cross-talk between channels due to film weave of said normal maximum value is substantially free of leakage of primary sound into an auxiliary sound channel.

5. Apparatus according to claim 4, wherein said outer sound tracks are modulated in like phase by a common channel of auxiliary sound, and said apparatus includes means for electrically summing the outputs of the sensors corresponding to the respective outer sound tracks.

* * * * *